US010018147B2

(12) United States Patent
Oso et al.

(10) Patent No.: US 10,018,147 B2
(45) Date of Patent: Jul. 10, 2018

(54) PISTON FOR ENGINE

(71) Applicant: KUBOTA Corporation, Osaka-shi, Osaka (JP)

(72) Inventors: Hiroki Oso, Sakai (JP); Hideyuki Koyama, Sakai (JP); Manabu Miyazaki, Sakai (JP); Hideyuki Goto, Sakai (JP); Takahito Hamasaki, Sakai (JP); Takahiro Yamazaki, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 3 days.

(21) Appl. No.: 15/134,470

(22) Filed: Apr. 21, 2016

(65) Prior Publication Data

US 2016/0312739 A1     Oct. 27, 2016

(30) Foreign Application Priority Data

Apr. 22, 2015  (JP) ................................ 2015-087827

(51) Int. Cl.
*F02F 3/02* (2006.01)
*F02F 3/10* (2006.01)
(Continued)

(52) U.S. Cl.
CPC .............. *F02F 3/10* (2013.01); *F02F 3/0084* (2013.01); *F16J 1/02* (2013.01); *F16J 1/08* (2013.01);
(Continued)

(58) Field of Classification Search
CPC ...... F02F 3/027; F02F 3/00; F02F 3/10; F02F 3/0084
(Continued)

(56) References Cited

U.S. PATENT DOCUMENTS 5,195,478 A * 3/1993 Kawabata ................. F02F 3/10
123/193.4
7,171,936 B2 * 2/2007 Rein ......................... C23C 4/16
123/193.4
(Continued)

FOREIGN PATENT DOCUMENTS

JP      2004137955 A      5/2004
JP      2005320934 A     11/2005
(Continued)

OTHER PUBLICATIONS

Extended Search Report dated Aug. 22, 2016 in EP Application No. 16164969.4.
(Continued)

*Primary Examiner* — Jacob Amick
*Assistant Examiner* — Charles Brauch
(74) *Attorney, Agent, or Firm* — Panitch Schwarze Belisario & Nadel LLP (57) ABSTRACT

A piston for an engine includes a skirt part, and a resin coating film and a recess formed on a surface of the skirt part. A plurality of the resin coating films are discretely arranged in spots on the surface of the skirt part, and a mesh-like groove is formed by the recess provided between the resin coating films. The recess formed on the skirt part between the resin coating films adjacent to each other in a piston circumference direction is set to be adjacent to another resin coating film in a piston moving direction. An end part of the resin coating film in the piston moving direction is formed in a concave shape when seen in a piston radius direction.

17 Claims, 6 Drawing Sheets

(51) Int. Cl.
    *F16J 1/02*          (2006.01)
    *F16J 1/08*          (2006.01)
    *F02F 3/00*         (2006.01)

(52) U.S. Cl.
    CPC ............... *F02F 3/00* (2013.01); *F02F 3/027* (2013.01); *F05C 2253/12* (2013.01); *F05C 2253/20* (2013.01)

(58) Field of Classification Search
    USPC ...................................... 123/193.6
    See application file for complete search history.

(56) References Cited

U.S. PATENT DOCUMENTS

| | | |
|---|---|---|
| 2005/0087166 A1 | 4/2005 | Rein et al. |
| 2014/0158081 A1 | 6/2014 | Suzuki et al. |

FOREIGN PATENT DOCUMENTS

| | | |
|---|---|---|
| JP | 4749399 B2 | 8/2011 |
| JP | 2014234739 A | 12/2014 |

OTHER PUBLICATIONS

Office Action dated Apr. 24, 2018 in JP Application No. 2015-087827.

\* cited by examiner

PRIOR ART

PISTON FOR ENGINE

CROSS-REFERENCE TO RELATED APPLICATIONS

This Application claims priority from Application 2015-087827 filed on Apr. 22, 2015 in Japan. The entire contents of this application are incorporated herein by reference in their entirety.

BACKGROUND OF THE INVENTION (1) Field of the Invention
The present invention relates to a piston for an engine.
(2) Description of Related Art
Conventionally, as shown in FIG. 6, a piston for an engine having a resin coating film 102 and a recess 103 on a surface of a skirt part 101 is known.

According to this kind of piston, a profile of the skirt part 101 is optimized by the resin coating film 102, and there are obtained advantages of reducing slapping noise of the piston and friction of the skirt part 101 by engine oil stored in the recess 103.

Figure 6:
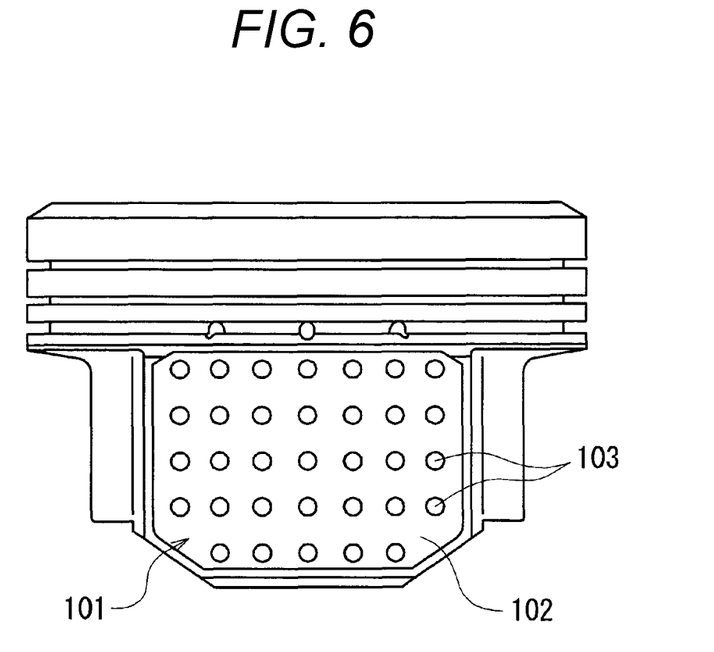
FIG. 6 is a side view of a piston for an engine according to a conventional technique.

However, in the conventional technique, as shown in FIG. 6, since the plurality of recesses 103 are discretely arranged in spots on the single resin coating film 102, a friction reducing function of the engine oil for the skirt part is insufficient.

In other words, as shown in FIG. 6, since the plurality of recesses 103 are discretely arranged in spots on the single resin coating film 102, the recess 103 is surrounded by the resin coating film 102 and therefore it is difficult to supply the engine oil to the recess 103. Thus, a sufficient amount of the engine oil is not held in the recess 103 and therefore the friction reducing function of the engine oil for the skirt part 101 is insufficient.

SUMMARY OF THE INVENTION

An object of the present invention is to provide a piston for an engine capable of improving supply of engine oil to a recess based on further study of a piston on which a resin coating film is formed.

In accordance with the present invention, there is provided a piston for an engine including a skirt part, and a resin coating film and a recess formed on a surface of the skirt part, wherein a plurality of the resin coating films are discretely arranged in spots on the surface of the skirt part, and a mesh-like groove is formed by the recess provided between the resin coating films, the recess formed on the skirt part between the resin coating films adjacent to each other in a piston circumference direction is set to be adjacent to another resin coating film in a piston moving direction, and an end part of the resin coating film in the piston moving direction is formed in a concave shape when seen in a piston radius direction.

According to the present invention, an engine oil holding area can be provided over a wide area on the skirt part. Since the plurality of resin coating films are discretely arranged in spots on the surface of the skirt part and the mesh-like groove is formed by the recess provided between the resin coating films, the engine oil holding area can be provided over the wide area on the skirt part.

Since the recess formed on the skirt part between the resin coating films adjacent to each other in the piston circumference direction is set to be adjacent to another resin coating film in the piston moving direction, the engine oil which flows out from both end openings of the recess by a reciprocating movement of the piston collides against the adjacent resin coating film in the piston moving direction and the engine oil is prevented from flowing out from the recess. Thus, an engine oil holding property of the mesh-like groove can be enhanced.

In addition, since the end part of the resin coating film in the piston moving direction is formed in a concave shape when seen in a piston radius direction, a lubricant which has moved along the recess by inertia in accordance with a piston movement collides against the concave end part of the resin coating film. Due to an angle of the concave shape, the lubricant does not move away in the circumference direction, but tends to return to the original recess by a bounce back movement.

Accordingly, more lubricant is held on the surface of the piston, and therefore a friction reducing function can be enhanced and fuel efficiency can be improved. In this way, according to the further study of the piston on which the resin coating film is formed, the piston for the engine capable of improving supply of the engine oil to the recess can be provided.

DETAILED DESCRIPTION OF PREFERRED EMBODIMENTS

Hereinafter, embodiments of a piston according to the present invention will be described with reference to the drawings by using a piston for a vertical type diesel engine.

First Embodiment

Figure 1:
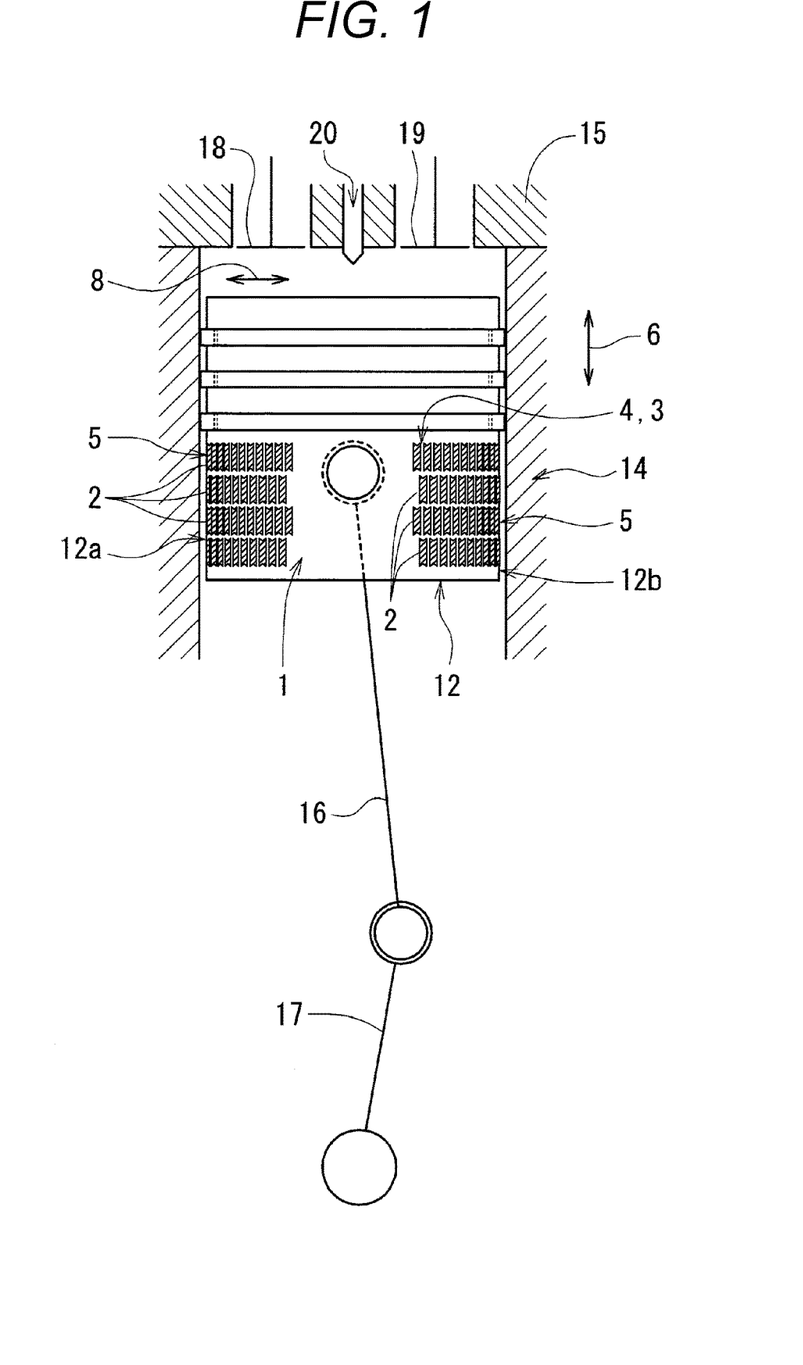
FIG. 1 is a vertical cross-sectional view of a piston fitted into a cylinder.

As shown in FIG. 1, a vertical type diesel engine and a piston thereof are formed such that a cylinder head 15 is assembled above a cylinder 14, a piston 12 is fitted into the cylinder 14, and a crank shaft 17 is interlockingly connected to the piston 12 via a con-rod 16.

An intake valve 18, an exhaust valve 19, and a fuel injector 20 are mounted to the cylinder head 15.

Figure 2A:
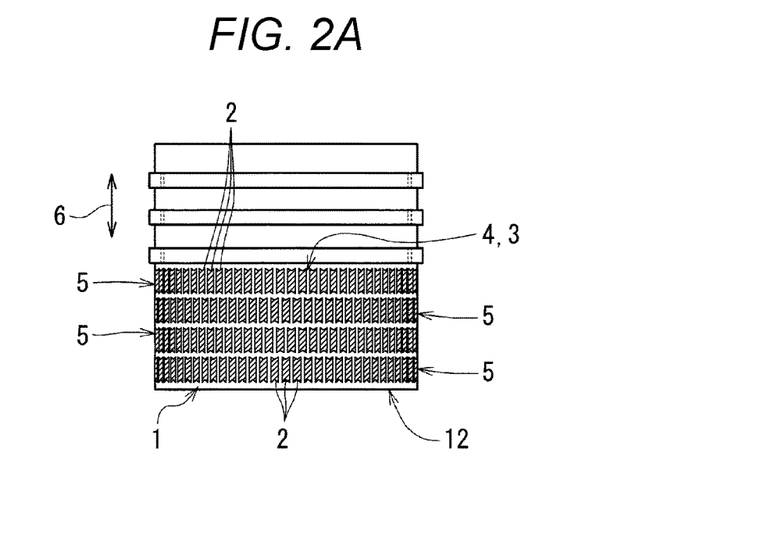
FIG. 2A is a side view of the piston.
Figure 2B:
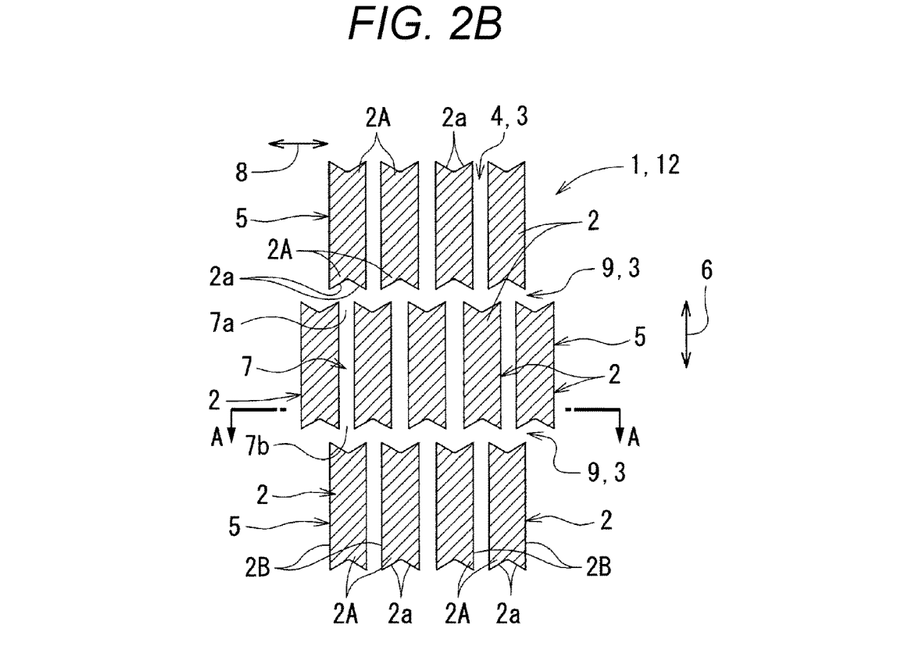
FIG. 2B illustrates a coating pattern of a resin coating film.

As shown in FIGS. 1, 2A, and 2B, in the piston 12 for the engine having a resin coating film 2 and a recess 3 provided on a surface of a skirt part 1, a plurality of the resin coating films 2 are discretely arranged in spots on the surface of the skirt part 1, and a mesh-like groove 4 is formed by the recess 3 provided between the resin coating films 2, 2 adjacent to each other. The mesh-like groove 4 is formed between the resin coating films 2, 2 and an inner bottom of the mesh-like groove 4 is formed by a metal surface of the skirt part 1 which is not covered with the resin coating film 2.

The resin coating film 2 and the recess 3 are formed at a thrust side 12a and an anti-thrust side 12b of the piston 12. The thrust side 12a refers to a side where the piston 12 is pressed against the cylinder 14 by a combustion pressure when the piston 12 is moved downward in a combustion process, and the anti-thrust side 12b refers to a side opposite to the thrust side 12a. A body of the piston 12 is made of a metal material such as cast iron or aluminum alloy. The resin coating film 2 is made of a resin material such as polyamide resin, epoxy resin, phenol resin, silicon resin, or polyimide resin. An inorganic solid lubricant such as transition metal oxide or graphite is contained in the resin coating film 2.

The resin coating film 2 is formed in a substantially rectangular shape in which a length of the resin coating film 2 in a piston moving direction 6 is longer than a length of the resin coating film 2 in a piston circumference direction 8. When seen in a piston radius direction, both end parts 2A, 2A of the resin coating film 2 in its longitudinal direction are formed in a concave shape, in particular, in a V-shape having edge surfaces 2a, 2a. Further, the resin coating film 2 and the recess 3 are provided adjacent to each other in the piston moving direction 6.

That is, the recess 3 formed between the resin coating films 2, 2 adjacent to each other in the piston circumference direction 8 of the skirt part 1 is set to be adjacent to the resin coating film 2 in the piston moving direction 6, and end parts 2A of the resin coating film 2 in the piston moving direction 6 are formed in a concave shape when seen in the piston radius direction.

As shown in FIGS. 2A, 2B, 3A, and 3B, the resin coating film 2 has a pair of vertical sides 2B, 2B along the piston moving direction 6, and the both end parts 2A, 2A (short sides). Each of the end parts 2A is formed in a V-shape by a pair of edge surfaces 2a, 2a. The resin coating film 2 is formed in a substantially rectangular shape (laid hand drum like shape) in which the vertical side 2B is apparently longer than the width of the resin coating film 2.

In FIG. 2B, a ratio of a length of the resin coating film 2 in the piston moving direction 6, a length of the resin coating film 2 in the piston circumference direction 8, the minimum distance between the resin coating films 2, 2 adjacent to each other in the piston moving direction 6, and a distance between the resin coating films 2, 2 adjacent to each other in the piston circumference direction 8 (a width of a groove portion 7) is set to 40:12:6:5, however the ratio is not limited to this.

Further, as shown in FIGS. 1, 2A and 2B, there is provided a resin coating film row 5 in which a plurality of the resin coating films 2 are arranged at a predetermined interval in the piston circumference direction 8 of the skirt part 1. A plurality of the resin coating film rows 5 are arranged in a zigzag manner in the piston moving direction 6 such that each of the resin coating film rows 5 is shifted by a half pitch in the piston circumference direction 8 with respect to the adjacent resin coating film row 5. Accordingly, both end openings 7a, 7b in the piston moving direction 6 of the groove portion 7 (recess 3) formed between the resin coating films 2, 2 adjacent to each other in the resin coating film row 5 are provided to face the resin coating film 2 in the adjacent resin coating film row 5 in a piston moving direction 6, in particular, to face the center part of the resin coating film 2 in the piston circumference direction 8.

Further, as shown in FIGS. 2A and 2B, in the piston 12 according to the first embodiment, a narrow angle θ formed by right and left edge surfaces 2a, 2a of the end part 2A of the resin coating film 2 is set to an angle of 120 degrees (alternatively, a range of 120 degrees±20 degrees). Here, an effect is obtained by setting the angle θ to a range of 60 degrees≤θ<180 degrees, but a better effect may be obtained by setting the angle θ to a range of "120 degrees±20 degrees".

Figure 3A:
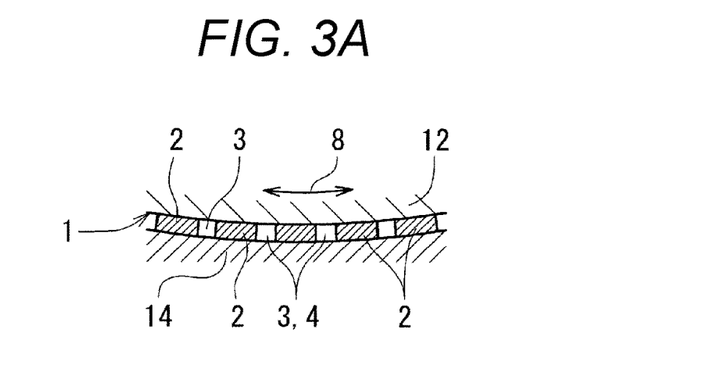
FIG. 3A is a cross-sectional view taken along line A-A in FIG. 2B.
Figure 3B:
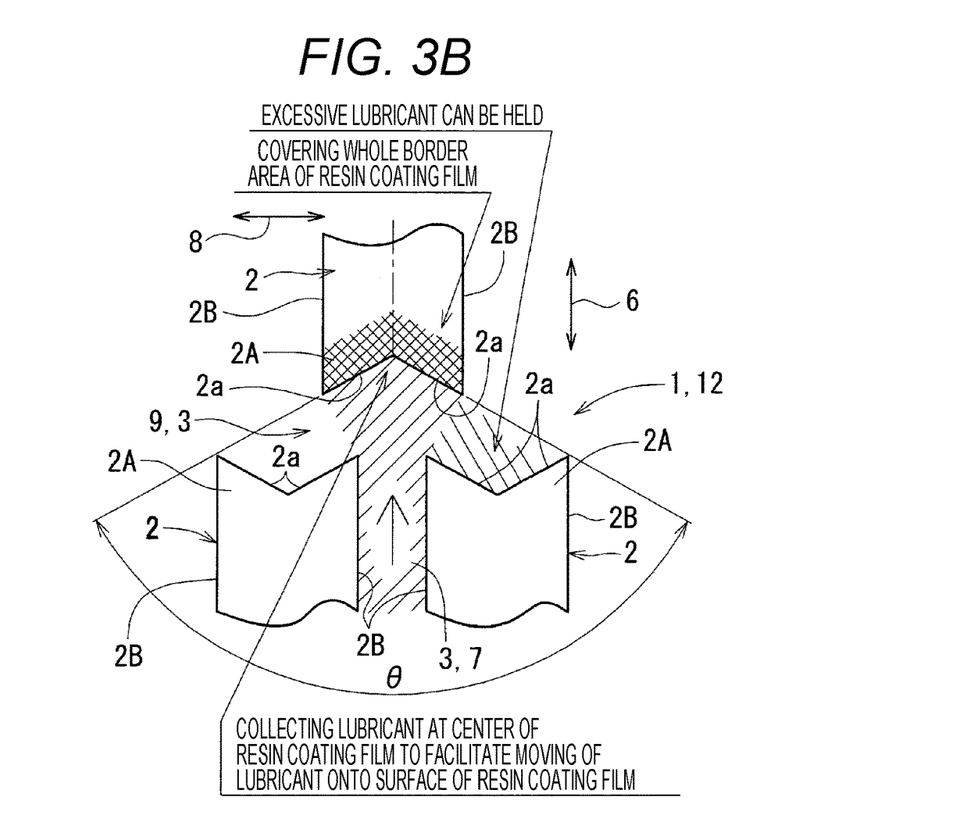
FIG. 3B illustrates a lubricant holding function of the resin coating film and a recess.

As shown in FIG. 3B, a lubricant, which moves in the recess 3 or the groove portion 7 formed between the resin coating films 2, 2 adjacent to each other in the piston circumference direction 8 in accordance with the movement (up and down) of the piston 12, flows out of the opening 7a, collides against the end part 2A of the adjacent resin coating film 2 in the piston moving direction 6 to be received, and then the lubricant is bounced back by the pair of the edge surfaces 2a, 2a.

That is, a recess, which is formed by the end parts 2A of the resin coating films 2 adjacent to each other and which extends in the piston circumference direction 8 in a zigzag manner, forms an oil storing groove 9 having an excellent lubricant holding property.

Since the bounced-back lubricant collides with the end part 2A of the resin coating film 2 forming the groove portion 7 and is further bounced back, or flows back to the original groove portion 7, the lubricant holding property is improved. Further, the bounced-back lubricant tends to move onto the resin coating film 2 adjacent to the groove portion 7, and therefore a positive pressure is generated between the cylinder 14 and the piston 12. The positive pressure separates a sliding surface of the piston 12 from a cylinder wall and reduces a friction, and therefore fuel efficiency can be improved.

A vertical direction (piston moving direction 6) passage of the lubricant can be formed by separately applying a texturing process to each area on a surface of the skirt part 1, and the lubricant can be effectively supplied to each part of the piston 12. Since the resin coating film rows 5, 5 adjacent to each other in the piston moving direction 6 are arranged in a zigzag manner by shifting the resin coating film rows 5 with respect to each other in the piston circumference direction 8, the lubricant can be efficiently supplied to the recess 3 by using a reciprocating movement of the piston 12.

In a piston for an engine according to a first embodiment, a concave shape of an end part 2A of a resin coating film 2 in a piston moving direction is set to a V-shape and the V-shape angle is set to a range of 120 degrees±20 degrees. Further, a length of the resin coating film 2 in the piston moving direction is set to be longer than a length of the resin coating film 2 in a piston circumference direction. It is preferable to set the V-shape angle to the range of 120 degrees±20 degrees because a lubricant holding property is further improved.

Second Embodiment

Figure 4A:
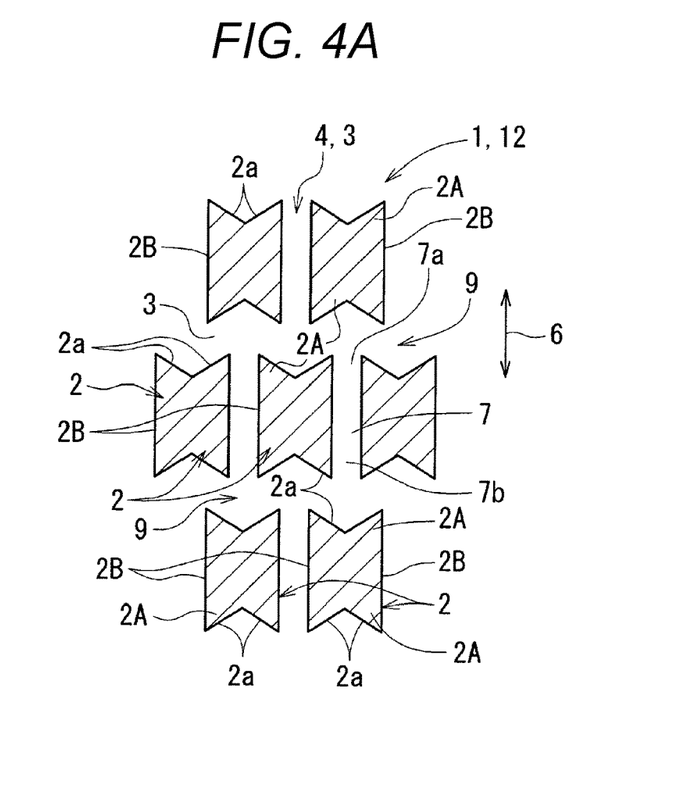
FIG. 4A illustrates a main part of a resin coating film and a recess according to a second embodiment.

As shown in FIG. 4A, in a piston 12 according to a second embodiment, a length of a vertical side 2B of a resin coating film 2 is substantially half of a length of the vertical side 2B of the resin coating film 2 (see FIGS. 2A and 2B) according to the first embodiment. With such a configuration, there is formed a mesh-like groove 4 with a smaller mesh size compared to that of the mesh-like groove 4 in the first embodiment.

Third Embodiment

Figure 4B:
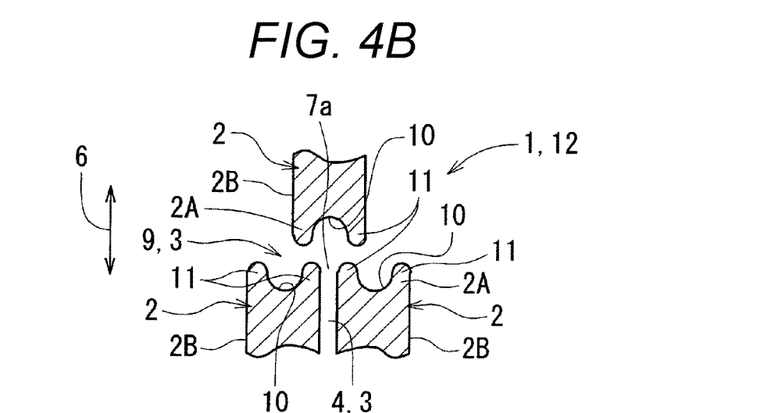
FIG. 4B illustrates a main part of a resin coating film and a recess according to a third embodiment.

As shown in FIG. 4B, in a piston 12 according to a third embodiment, a concave shape of an end part 2A of a resin coating film 2 in a piston moving direction 6 is set to a curved shape, and the end part 2A has a curved edge surface 10. In this case, edge parts 11, which are formed in a convex curved shape when seen in a piston radius direction, are provided at both ends of the end part 2A in a width direction of the resin coating film 2.

Fourth Embodiment

Figure 5A:
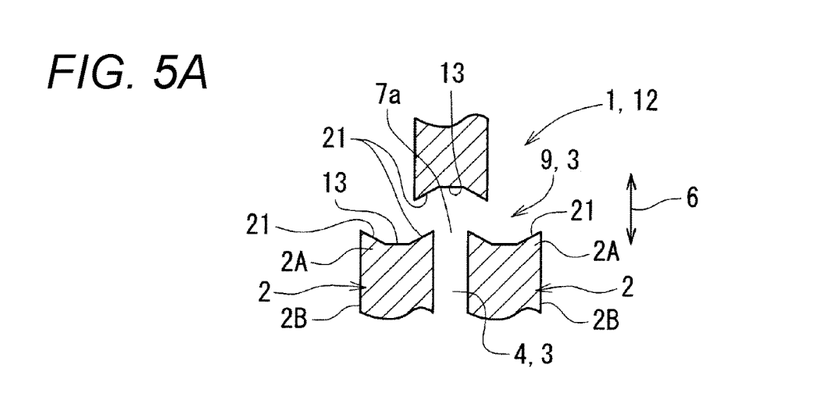
FIG. 5A illustrates a main part of a resin coating film and a recess according to a fourth embodiment.

As shown in FIG. 5A, in a piston 12 according to a fourth embodiment, a concave shape of an end part 2A of a resin coating film 2 in a piston moving direction 6 may be formed by three surfaces including a bottom surface 13, and left and right inclined surfaces 21, 21.

Fifth Embodiment

Figure 5B:
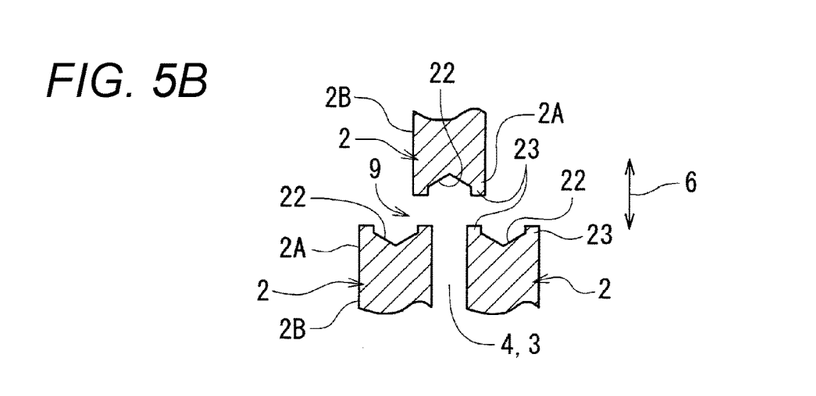
FIG. 5B illustrates a main part of a resin coating film and a recess according to a fifth embodiment.

As shown in FIG. 5B, in a piston 12 according to a fifth embodiment, a concave shape of an end part 2A of a resin coating film 2 in a piston moving direction 6 may be formed by a V-shape bottom surface 22 and right and left convex parts 23, 23.

Sixth Embodiment

Figure 5C:
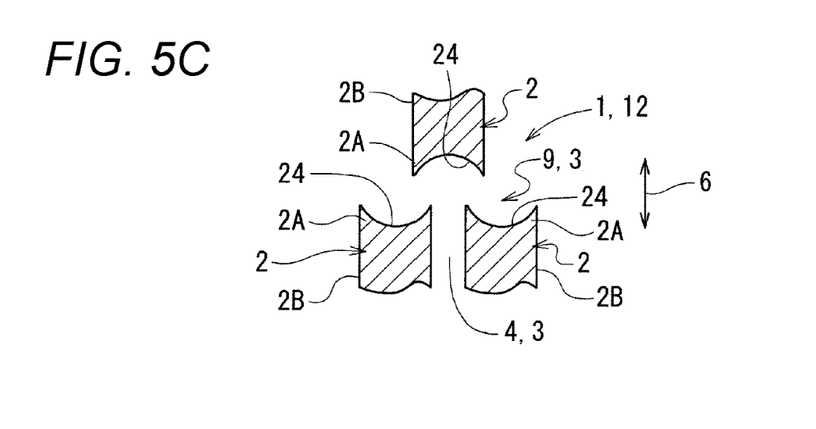
FIG. 5C illustrates a main part of a resin coating film and a recess according to a sixth embodiment.

As shown in FIG. 5C, in a piston 12 according to a sixth embodiment, a concave shape of an end part 2A of a resin coating film 2 in a piston moving direction 6 may include a single concave curved surface 24. In this case, the concave curved surface 24 may have various shapes such as a circular shape and an ellipse shape.

What is claimed is:

1. A piston for an engine comprising:
   a skirt part; and
   a plurality of resin coating films formed on a surface of the skirt part,
   wherein the resin coating films are arranged in a plurality of discrete spots on the surface of the skirt part, and a mesh-like groove is formed by a recess defined by the resin coating films adjacent to each other and the surface of the skirt part between the resin coating films,
   the plurality of resin coating films are arranged at a predetermined interval in a piston circumference direction of the skirt part forming a plurality of resin coating film rows, such that each of the resin coating film rows adjacent to each other in a piston moving direction is arranged by shifting the resin coating film rows with respect to each other in the piston circumference direction,
   the recess formed on the skirt part between the resin coating films adjacent to each other in the piston circumference direction has end openings each of which is set to be adjacent to another resin coating film in the piston moving direction, and
   both end parts of each of the resin coating films in the piston moving direction are formed in a concave shape lying in a plane defined by the surface of the skirt part when seen in a piston radius direction, wherein the concave shape extends inwardly to each resin coating film.

2. The piston for the engine according to claim 1, wherein the concave shape of the end parts of the resin coating films in the piston moving direction is set to a V-shape.

3. The piston for the engine according to claim 2, wherein a V-shape angle of the V-shape is set to a range of 120 degrees±20 degrees.

4. The piston for the engine according to claim 1, wherein the concave shape of the end parts of the resin coating films in the piston moving direction is set to a curved shape.

5. The piston for the engine according to claim 1, wherein a length of the resin coating films in the piston moving direction is set to be longer than a length of the resin coating films in the piston circumference direction.

6. The piston for the engine according to claim 2, wherein a length of the resin coating films in the piston moving direction is set to be longer than a length of the resin coating films in the piston circumference direction.

7. The piston for the engine according to claim 3, wherein a length of the resin coating films in the piston moving direction is set to be longer than a length of the resin coating films in the piston circumference direction.

8. The piston for the engine according to claim 4, wherein a length of the resin coating films in the piston moving direction is set to be longer than a length of the resin coating films in the piston circumference direction.

9. The piston for the engine according to claim 1, wherein the plurality of resin coating film rows are arranged in a zigzag manner in the piston moving direction, such that each of the resin coating film rows is shifted by a half pitch in the piston circumference direction with respect to the adjacent resin coating film row.

10. The piston for the engine according to claim 9, wherein the concave shape of the end parts of the resin coating films in the piston moving direction is set to a V-shape.

11. The piston for the engine according to claim 10, wherein a V-shape angle of the V-shape is set to a range of 120 degrees±20 degrees.

12. The piston for the engine according to claim 9, wherein the concave shape of the end parts of the resin coating films in the piston moving direction is set to a curved shape.

13. The piston for the engine according to claim 9, wherein a length of the resin coating films in the piston moving direction is set to be longer than a length of the resin coating films in the piston circumference direction.

14. The piston for the engine according to claim 10, wherein a length of the resin coating films in the piston moving direction is set to be longer than a length of the resin coating films in the piston circumference direction.

15. The piston for the engine according to claim 11, wherein a length of the resin coating films in the piston moving direction is set to be longer than a length of the resin coating films in the piston circumference direction.

16. The piston for the engine according to claim 12, wherein a length of the resin coating films in the piston moving direction is set to be longer than a length of the resin coating films in the piston circumference direction.

17. A piston for an engine comprising:
    a skirt part; and
    a plurality of resin coating film rows formed on a surface of the skirt part, the resin coating film rows shifted with respect to each other in a piston circumferential direction, both end parts of each of the resin coating film rows in a piston moving direction having a concave shape when seen in a piston radius direction, wherein the concave shape extends inwardly at both end parts,
    a recess formed on the skirt part between the resin coating film rows adjacent to each other in the piston circumference direction, the recess having end openings each of which is set to be adjacent to another resin coating film row in the piston moving direction;
    a mesh-like groove formed by the plurality of recesses, wherein as the piston reciprocates in the piston moving direction, a lubricant in the recess or the mesh-like groove impacts the end part of the adjacent resin coating film row and is bounced back or flows back into the recess of the mesh-like groove.

* * * * *